Sept. 29, 1959 C. M. STARKEY 2,906,386

PARKING METERS

Filed Jan. 5, 1955 4 Sheets-Sheet 1

INVENTOR.
Charles M. Starkey
BY Frease & Bishop
ATTORNEYS

Sept. 29, 1959 C. M. STARKEY 2,906,386

PARKING METERS

Filed Jan. 5, 1955 4 Sheets-Sheet 2

INVENTOR.
Charles M. Starkey
BY Frease & Bishop
ATTORNEYS

INVENTOR.
Charles M. Starkey
BY
Frease & Bishop
ATTORNEYS

PARKING METERS

Filed Jan. 5, 1955 4 Sheets-Sheet 4

INVENTOR.
Charles M. Starkey
BY
Frease & Bishop
ATTORNEYS 2,906,386

PARKING METERS

Charles M. Starkey, Canton, Ohio, assignor, by mesne assignments, to Rockwell Manufacturing Company, a corporation of Pennsylvania Application January 5, 1955, Serial No. 479,994

7 Claims. (Cl. 194—72)

The invention relates generally to parking meters, and more particularly to a parking meter of the type shown in U.S. Patent 2,755,904.

This invention involves a number of improvements in the parking meter disclosed in the above-mentioned patent. The improvements combine to provide a parking meter that operates more satisfactorily for everyone concerned.

The embodiment of the parking meter set forth in said patent was provided with stops for limiting rotation of the setting plate that were permanently secured to the rotatable setting plate and to the meter housing. An improvement over that arrangement of permanent stops is the provision of an adjustable stop that enables an accurate setting of the setting plate to accommodate inaccuracies or accumulations of tolerances in the assembly of other parts of the meter.

In the past it had been possible to deposit a coin and obtain a greater amount of time than paid for merely by rotating the manual operating handle with a quick twist, causing the time indicator to advance beyond the paid-for-time limit. To prevent this occurrence, a pawl is mounted near the setting plate and adapted to drop into a notch on the periphery of the setting plate when the latter is turned to its limit. A flange on the pawl is thereby lodged in another notch on the outside of the rack. This results in a positive acting pawl that stops the time indicator at the proper place regardless of the rate of acceleration of the handle.

Another improvement is the elimination of stationary coin retainer points at the edge of the coin channel. By the substitution of removable coin retainer pins the meter has greater versatility in selective coin operation. Thus, in one location a retainer pin registers for a coin of one size and in other locations the pin registers for a coin of other sizes.

With the parking meter of said patent, a coin upon passing through the first portion of the coin channel caused the release of a previous coin held in the coin observation window, known as the "Scotch eye." Upon hearing the previous coin being released the user was often prompted to conclude that the operation of meter was complete. If the manual operating handle were then released, the value of the later coin would be lost unless the handle were subsequently turned to the limit of its movement. To obviate this disadvantage, an improved coin release lever is provided for release of the previous coin at the "Scotch eye" at the completion of the movement of the handle.

Moreover, the coin release lever is provided with inclined edges forming a tapered end for moving the setting pawl out of rack-engaging position on return movement of the setting plate. This eliminates a release pawl in the previous meter for release of the setting pawl.

Another improvement of this invention is the addition of a means for actuating the violation flag. In the former parking meter of the type to which this application pertains the violation flag was out of sight as long as there was any time left in the meter. As a result it was possible to prevent the expiration of time by depositing a coin, registering some time in the meter, and then inserting a wedge between the handle and the cover of the meter to prevent the handle from returning to normal or return or resetting position. A yoke or lever is herein provided to hold the violation flag up at all times when the handle is not in its normal or return position.

Finally, in the former meter a spline connection existed between the clock shaft and the time plate secured thereon by a split washer. As a result, looseness and backlash developed and resulted in inaccurate setting of the pointer indicator. Thus, the construction was changed to provide a bushing pressed on the shaft with a time plate bolted to the bushing.

Accordingly, it is a primary object of the present invention to improve and simplify the construction of the parking meter shown in said patent, and to render its manual resetting operation more positive and less apt to cause jamming or other interference with proper functioning of the meter mechanism.

More specifically, it is an object to improve and simplify the construction and operation of the centrifugal overspeed stop to prevent excess rotation of the time plate regardless of the rate of rotation of the setting plate.

It is another object to provide an adjustable stop to permit accurate adjustment of the limit of forward movement of the setting plate due to inaccuracies or accumulation of tolerances in one direction or the other in the construction or assembly of other parts of the meter.

It is another object to provide removable coin pick-up pins that give greater versatility in selective coin operation of the meter.

Another object of this invention is the provision of a lever for the release of a previously deposited coin at the "Scotch eye" upon the completion of the forward movement of the setting plate.

Another object of this invention is the provision of a lever means for raising the violation flag when the manual handle is not in the return position.

Finally, it is an object of this invention to provide an improved parking meter which is inexpensive in construction and which satisfies the foregoing objects and desiderata.

These and other objects and advantages apparent to those skilled in the art from the following description and claims may be attained, the stated results achieved, and the described difficulties overcome, by the discoveries, principles, apparatus, parts, combinations, subcombinations, and elements which comprise the present invention, the nature of which are set forth in the following general statement, the preferred embodiment of which—illustrative of the best mode in which applicant has contemplated applying the principles—is set forth in the following description, and which are particularly and distinctly pointed out and set forth in the appended claims forming a part hereof.

Generally, the improved parking meter constituting the present invention includes the provision of an adjustable stop for limiting movement of the setting plate, the stop being secured to the housing of the meter and having an inclined striking edge associated with a stop flange on the setting plate; an overspeed stop including a pawl pivotally mounted on the housing and having a first flange or detent portion spring-biased against the periphery of the setting plate and also having a second flange or detent portion, the overspeed stop also including a notch on the periphery of the setting plate for the receipt of the first detent upon rotation of said plate, the second detent portion thereby engaging a notch on the rack in order to prevent rotation of the rack and the attached time indicator beyond the time paid for; a pin removably secured to at least one of several holes in the edge of the coin channel, each hole corresponding to a position for a different sized coin; a lever pivotally mounted on the housing and having flange means at one end for retaining a coin at the "Scotch eye" in the housing and having flange means at other end positioned to be actuated by the setting pawl as the setting plate approaches the limit of its movement, whereby the coin in the "Scotch eye" is released; the provision of variously spaced teeth on the inside of the rack to accommodate various combinations of coins; a yoke means associated with the violation flag for permitting the flag to remain in an expiration position until the handle has returned to a resetting or normal position; and a bushing secured to the clock arbor by a press fit, the bushing having the time plate bolted thereto.

Referring to the accompanying drawings which are illustrative of the preferred embodiment of the invention, by way of example, and in which similar numerals refer to similar parts throughout:

Figure 1:
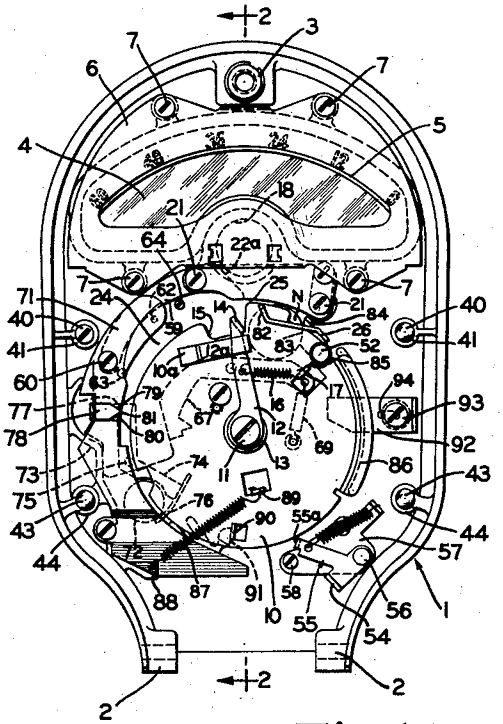
Fig. 1 is an interior view of the meter having a one-hour time scale, looking in the direction of the arrows 1—1 of Fig. 2, with the time mechanism removed, the parts being shown with a nickel coin at the top of the coin channel in position for the setting of the meter.
Figure 3:
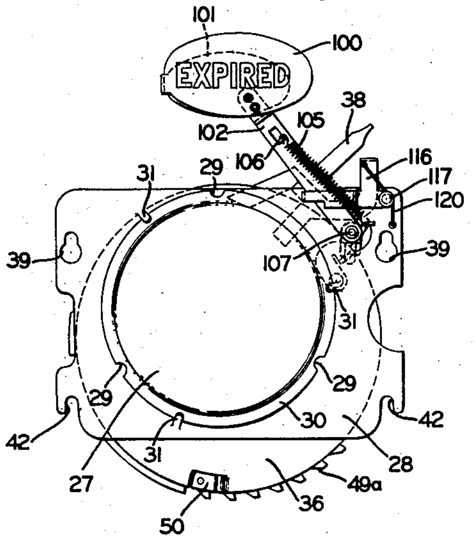
Fig. 3 is a rear elevational view of the indicator, time mechanism and setting rack, detached from the coin controlled resetting mechanism.
Figure 5:
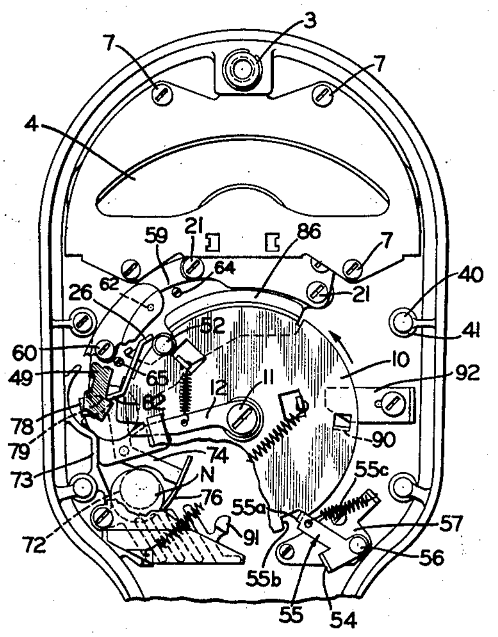
Figure 6:
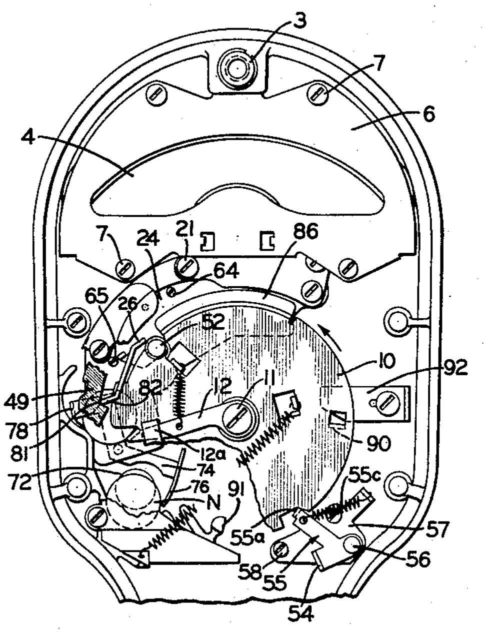
Figure 7:
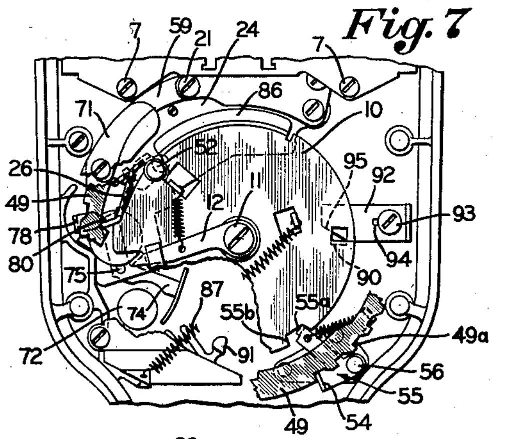
Figure 8:
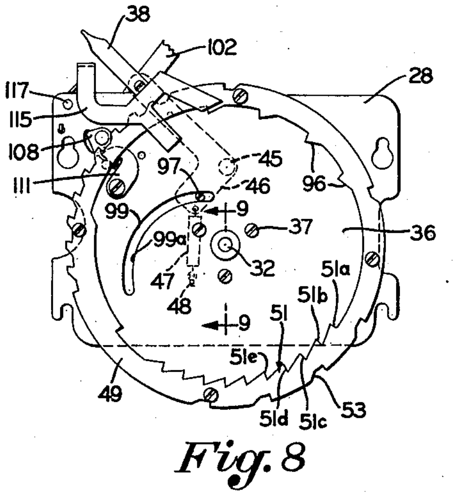
Figure 9:
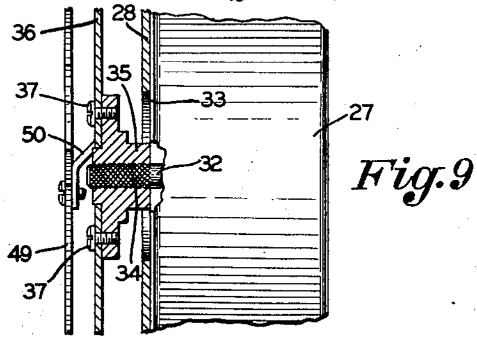
Figure 10:
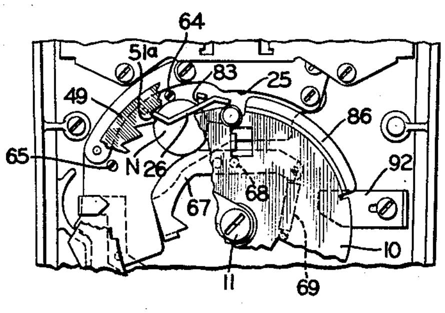
Figure 11:
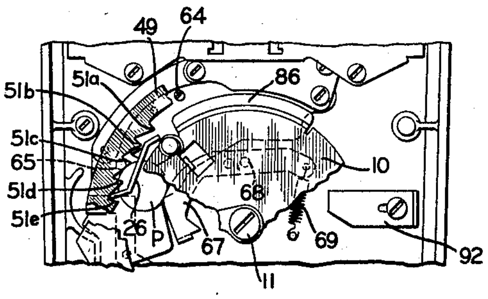
Figure 12:
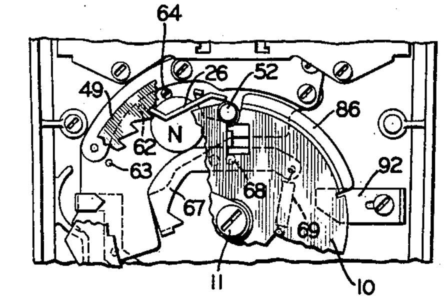
Figure 13:
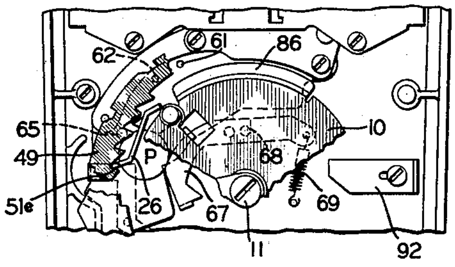
Figure 14:
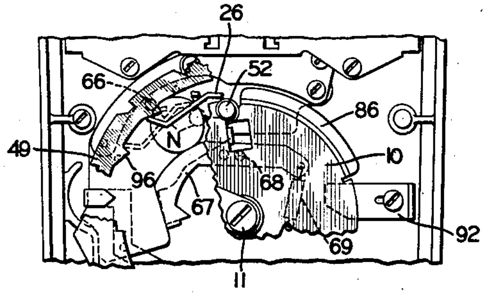
Figure 15:
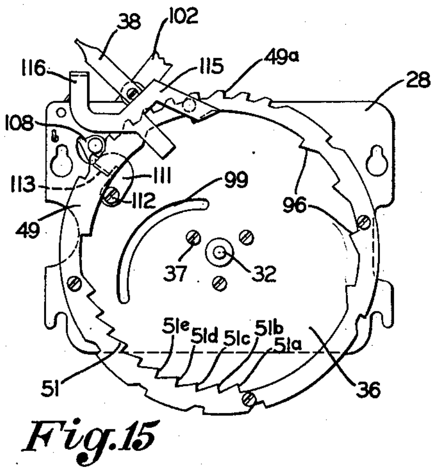
Figure 16:
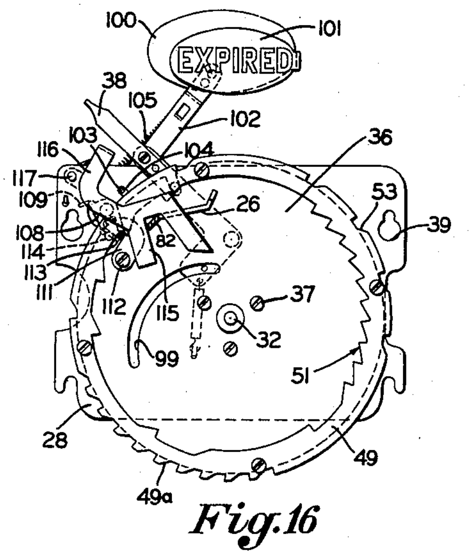
Figure 18:
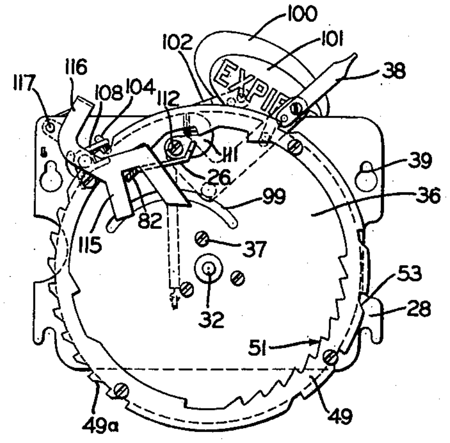
Figure 17:
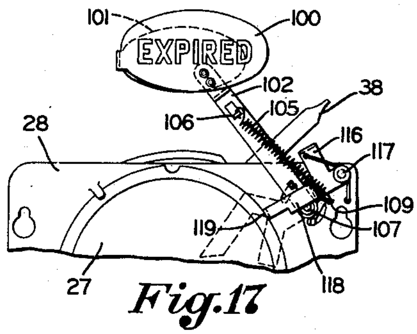
Figure 19:
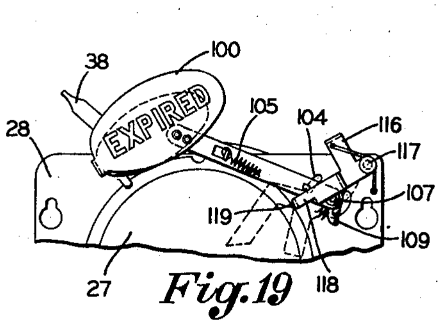
Figure 20:
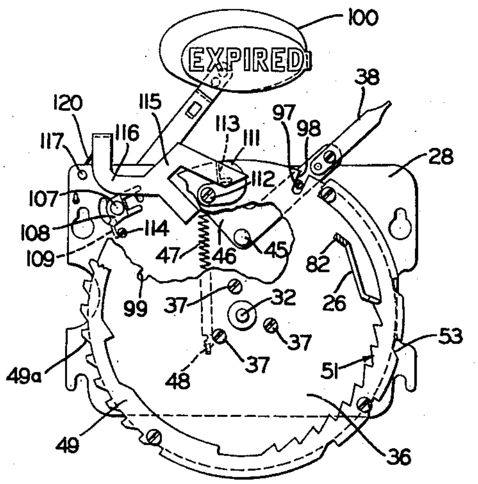
Figure 21:
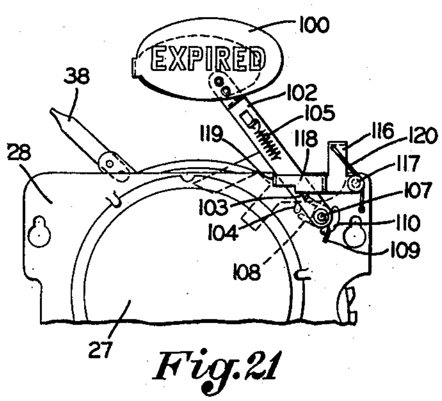

Fig. 5 is an interior view similar to Fig. 1 showing the time setting plate near the limit of its movement, showing the overspeed pawl in a notch on the periphery of the setting plate, showing a nickel coin retained between the coin locating lever and the upper end of the "Scotch eye" lever, and showing the setting pawl contacting the upper bevelled edge of the "Scotch eye" lever, the setting plate being broken away to show a previously deposited nickel coin at the "Scotch eye" window;

Fig. 6 is an interior view similar to Fig. 5 showing the setting plate nearer the limit of its movement, showing the release of a previously deposited nickel coin at the "Scotch eye," showing actuation of the "Scotch eye" lever by the setting pawl as it passes the tapered end at the upper end of said lever;

Fig. 7 is a fragmentary interior view of the meter similar to that shown in Fig. 6 showing the setting plate at the limit of its rotation, and showing the setting pawl below the tapered end of the "Scotch eye" lever;

Fig. 8 is a front elevation of the mechanism shown in Fig. 3, showing the assembly of the time indicator with a cam slot in the time plate and showing a corresponding change of position of the annular setting rack;

Fig. 9 is an enlarged, fragmentary, sectional view taken on the line 9—9 of Fig. 8;

Fig. 10 is a fragmentary view similar to Fig. 1 showing a nickel coin at the nickel retaining pin causing the setting pawl to engage the setting rack;

Fig. 11 is a view similar to Fig. 10 showing a penny coin just beyond the penny retaining pin causing the setting pawl to engage the setting rack;

Fig. 12 is a view similar to Fig. 10, the penny retaining pin being removed;

Fig. 13 is a view similar to Fig. 11, the nickel retaining pin being removed;

Fig. 14 is a view similar to Fig. 10 showing a nickel retaining pin at a position between the positions of the penny and nickel retaining pins shown in Fig. 10;

Fig. 15 is a view similar to Fig. 8 showing the rack position corresponding to the position of the retaining pin shown in Fig. 14;

Fig. 16 is a front elevational view of the timing assembly showing the time-expiration flag in the upright position, the time indicator at zero position and the setting pawl at the returned position within the yoke controlling the flag;

Fig. 17 is a fragmentary rear view of the timing assembly corresponding to that shown in Fig. 16;

Fig. 18 is a view similar to Fig. 16 showing the time indicator at the hour position and showing the flag at the lower position;

Fig. 19 is a fragmentary rear view of the timing assembly corresponding to that shown in Fig. 18;

Fig. 20 is a front elevational view of the timing mechanism showing the flag in the raised position, the indicator at the hour position, the setting pawl engaging the setting rack at the limit of the movement thereof, and showing the yoke at the raised position;

Fig. 21 is a fragmentary rear view corresponding to that shown in Fig. 20; and

Figure 22:
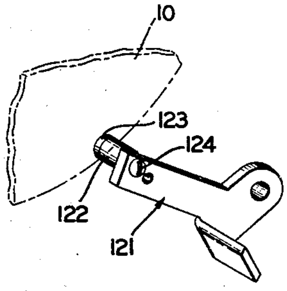

Fig. 22 is a perspective view of another embodiment of the overspeed pawl.

As shown in Fig. 1, one part of a two-part meter housing is generally indicated at 1 and has hinge portions 2 for connection with the other part of the housing in the usual manner. The other housing part may include or be connected to a coin receptacle and is supported on a post or standard in a well-known manner. The upper part of the housing 1 is preferably provided with a screw lock 3 in order to make a locked connection with a screw stud on the other housing portion. The particular construction of the meter housing is more or less conventional and forms no part per se of the present invention.

A glass observation window 4 is provided in the upper portion of the housing 1 for the purpose of observing a time scale 5 across the top of the window. The window 4 and the time scale 5 are retained in place by a window frame plate 6 which is secured to the housing part 1 by means of screws 7.

On the exterior of the housing part 1 is a manual operating handle 8 (Fig. 2) having integral shaft 9 which is journally mounted within the housing 1. To the inner end of the shaft 9 is secured a round setting plate 10 by a screw 11 (see also Fig. 1), whereby the setting plate 10 may be rotated with the handle 8. Between the head of the screw 11 and the setting plate 10 is mounted one end of a coin locating lever 12 which is separated from the setting plate 10 by a washer 13.

As shown in Fig. 1, the lever 12 extends radially of the plate 10 where it is retained for rotation movement only by a back-up bracket **12*a* one end of which is secured to the plate 10 at 10*a* such as by a spot weld. The other end of the coin locating lever 12 is provided with a coin engaging portion or flange 14 which extends substantially at right angles to the axis of the lever and through a peripheral notch 15 in the setting plate 10. A helical spring 16 extends between the lever 12 and an ear 17 extending from the setting plate 10, the ends of the spring being secured in holes provided in the lever and ear. Thus, the coin locating lever 12 is yieldingly engaged against the top edge of the notch 15** as shown in Fig. 1.

Figure 2:
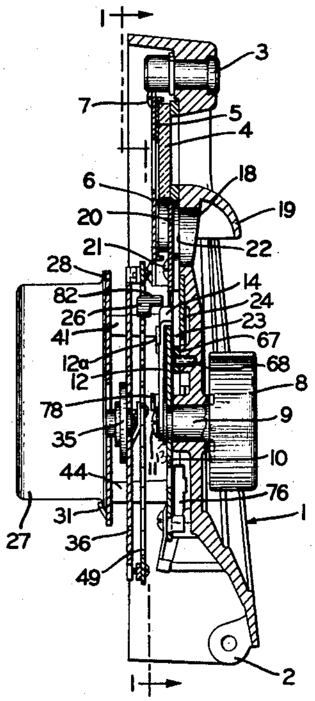
Fig. 2 is a vertical sectional view taken on line 2—2 of Fig. 1.

A coin entry opening 18 is located centrally in the housing part 1 preferably below the window 4 and has a protecting hood 19 extending downwardly over the top portion of the opening (Fig. 2). A coin entry back plate 20 is secured to the interior of the housing part 1 by screws 21 and forms a coin entry slot 22 along the interior surface of the said housing part, the upper end of which slot communicates with the coin entry opening 18. The lower end of the slot 22 communicates with a coin channel 23 disposed between the setting plate 10 and a plate 24 secured to the inner surface of the housing part 1 by means of the screws 21. The lower edge of the back plate 20 is arcuate at 25 so that said edge may serve as a cam guide for a setting pawl 26 as will be described hereinbelow.

Figure 4:
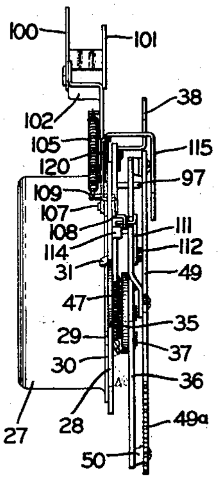
Fig. 4 is a side elevational view of the mechanism shown in Fig. 3.

As shown in Figs. 2–4, a clock mechanism which actuates the parking meter is mounted within a casing 27 and is secured to a mounting plate 28 by spaced peripheral notches 29 on a peripheral flange 30 of the case 27, the notches 29 have corresponding lugs 31 extending from the mounting plate 28. A driven arbor shaft 32 extends from the clock mechanism within the case 27 through a hole 33 in the plate 28 (Fig. 9). The end of the shaft 32 is knurled at 34 for the purpose of securing a flanged nut 35 thereto by means of a press fit to prevent slipping. To the flanged nut is secured a circular time plate 36 by several screws 37. Thus the plate 36 is positively connected to the arbor shaft 32 of the clock mechanism to drive the time plate 36 and a time indicator or pointer 38 (Figs. 3 and 4) from a resetting position to the zero or time-expired point at a constant speed regulated by an escapement mechanism in a conventional manner.

As indicated in Fig. 3, the mounting plate 28 may be provided with upper key hole slots 39 for attachment by screws 40 (Fig. 1) to upper mounting studs 41 on the housing 1, and with bottom notches 42 (Fig. 3) for engaging screws 43 secured to bottom mounting studs 44 (Fig. 1). Hence, the mounting plate 28, time mechanism, time plate 36 and indicator 38 are easily detached as a unit from the coin controlled setting mechanism when mounted on the housing 1.

As shown in Fig. 20, the indicator 38 is pivoted at its lower end at 45 to the mounting plate 28 under the time plate 36. The location of the pivot 45 has a radius measured from the shaft 32 at the center of the plate 36 equal to one-half the radius from the shaft to the outer periphery of the plate. The lower end of the indicator 38 is provided with an angular arm 46 (Fig. 8), to which is secured one end of a spring 47. The other end of the spring is secured to the mounting plate 28 at 48. Thus, the spring 47 maintains the pin 97 against a precision edge 99*a* of the cam slot 99, as shown in Figs. 8 and 20.

An annular setting rack 49 is mounted on and spaced from the time plate 36 by means of spacer lugs 50 (Fig. 9) integral with the time plate. The inner periphery of the rack 49 is provided with spaced teeth generally indicated at 51 (Fig. 8) that are adapted to be engaged by the coin controlled setting pawl 26 which is pivotally mounted at 52 on the periphery of the setting plate 10 (Fig. 1). In addition, the outer periphery of the rack 49 is provided with notches 53 (Fig. 8) which are adapted to be engaged by a flange or detent 54 on a pawl, generally indicated at 55 (Fig. 1), that is pivotally mounted at 56 to a bracket plate 57 which, in turn is secured on the housing 1 by screws 58.

The purpose of the pawl 55 is to prevent overspeeding of the timing mechanism. When the setting plate 10 is in the normal or returned position as shown in Fig. 1, a lateral flange 55*a* of the pawl 55 contacts the periphery of the plate against which it is constantly urged by a spring 55*c*. One end of the spring 55*c* is lodged in a hole in the pawl 55, and the other end of the spring is secured in a similar manner to the bracket plate 57. Upon rotation of the setting plate 10 to the position shown in Fig. 5, a notch 55*b* located in the periphery of the setting plate 10 comes into play with the pawl 55 whereupon the pawl flange 55*a* enters the notch as shown. When the setting plate 10 is completely rotated, as shown in Fig. 7, so that the stop flange 90 engages a stop 92, the pawl flange 55*a* has moved completely into the notch 55*b*. This movement of the pawl 55 into the notch 55*b* causes the flange or detent 54 to rotate into operative position with one of a number of notches 49*a* on the external periphery of the annular setting rack 49. Accordingly, the rack 49 is prevented from rotating beyond a position corresponding to the period of time purchased by a particular coin deposited. The teeth 49*a* are so distributed around the external periphery of the rack 49 (Fig. 16) to prevent overspeeding of the timing mechanism by rotating the manual handle at a greatly accelerated rate.

As shown in Fig. 1, an arcuate plate 59 is secured to the plate 24 adjacent the housing 1 about a peripheral portion of the setting plate 10. The plate 59 is retained in position by means of the screw 21 and a screw 60. The plate 59 is substantially the same thickness as the coin channel 23 (Fig. 2) which is disposed between the setting plate 10 and the plate 24. In addition, the upper end of the plate 59 may extend under the coin entry back plate 20 and forms one edge 22*a* of the coin entry slot 22. At spaced portions along the lower side of the arcuate plate 59 is a series of apertures 61, 62 and 63 in the plate 24 (Figs. 1, 12 and 13). Each aperture 61, 62 and 63 is threaded to receive a coin retainer pin. As shown in Figs. 1 and 5, a coin retainer pin 64 is secured in the aperture 61 and in Fig. 5 a coin retainer pin 65 is mounted in the aperture 63. In addition, a coin retainer pin 66 may be located in the aperture 62 as shown in Fig. 14. In order to operate the parking meter with different combinations of coins and time intervals, the detachable coin retainer pins 64, 65 and 66 may be used in various combinations.

In Fig. 10 the nickel coin N is shown lodged between the coin retainer pin 64 and the edge of the coin engagement lever 67. Upon further rotation of the setting plate 10 the cam arm 83 forces the coin N beyond this position, causing the coin engagement lever 67 to yield inwardly about its pivot point 68 against the spring 69. In addition, the coin retaining pin 65 (Fig. 10) is closer to the edge of the coin engagement lever 67 than is the coin retaining pin 64, so that a penny coin P will pass between the pin 64 and the lever 67 but will be stopped by the smaller distance between the pin 65 and said lever. Further rotation of the setting plate 10, however, will force the penny coin P (Fig. 11) to pass between the pin 65 and the lever 67, the latter yielding inwardly about its pivot point 68 in a manner previously described with respect to the nickel coin N in Fig. 10. Accordingly, the meter may be provided with two coin retaining pins 64 and 65 for the purpose of using the meter for nickel and penny operations.

The meter may also be used for either nickel or penny operations. Hence, the coin retaining pin 65 may be detached, leaving only the coin retaining pin 64 as shown in Fig. 12 for nickel coin operation. In a meter having only the pin 64 as shown in Fig. 12, a penny coin will not operate the meter and will pass through the coin channel 23 without actuating the setting pawl 26.

On the other hand, the meter may be adjusted for obtaining only a penny's worth of time with either a penny or nickel coin by removing the coin retaining pin 64 from its aperture 61 (Fig. 13), leaving only the coin retaining pin 65. In such event the pawl 26 is actuated to engage rack tooth 51*e* on the rack 49, whereupon the timing mechanism is rotated through a smaller arc than is the case in Fig. 10 where the pawl 26 engages the rack tooth 51*a* nearer the beginning of the rotation of the setting plate 10.

The meter may also be adjusted for operation with nickel coins to register time periods other than one hour. For such operations the time scale 5 (Fig. 1) which shows the full scale of sixty minutes may be replaced by a two-hour scale. In addition, a corresponding change may be made in the meter including removal of both coin retainer pins 64 and 65 and the insertion of the coin retainer pin 66 in the aperture 62 which is between the pin 64 and 65 (Fig. 14). With the coin retainer pin 66 a nickel coin N will travel slightly further through the coin channel before contacting the pin 66. This results in an actuation of the setting pawl 26 to a position different from that when actuated by a nickel coin stopped by the pin 64 (Fig. 10). In addition the setting rack 49 is reset to a corresponding position (Fig. 15)

so that the internal rack teeth 51 which are closely grouped together, are located at the lower part of the rack and out of position for engagement by the setting pawl 26. A series of four rack teeth 96 are disposed in position for operation with the setting pawl 26. As shown in Fig. 15, the teeth 96 are spaced at greater intervals than are the teeth 51. Hence, the meter is adjusted for either one hour with two nickel coins, or two hours with four nickel coins.

Other combinations of coins and time intervals may be established by making additional changes in the setting of the meter parts. When the meter is operated as a one-hour meter, as in Fig. 1, the one-hour time scale 5 is used. The operative connection between the time plate 36 and the indicator 38 is a pin 97 (Fig. 20) screwed in the indicator and projecting into a peripheral notch 98 in the time plate. Inasmuch as the pivot 45 of the indicator 38 is located on a radius one-half that of the outer periphery of the plate 36, as previously described, as the pin 97 is rotated on the plate, the indicator 38 travels through an arc twice as great as that travelled by the peripheral notch 98. Accordingly, as the rack 49 and the plate 36 are rotated through 45° by a nickel coin, the indicator 38 is rotated through 90° to bring it to the 60-minute setting on the time scale 5. The pin 97 is movable in the notch 98 to compensate for the difference in radii during rotation.

As shown in Fig. 8, the pin 97 may be removed to an aperture in the angular arm 46 of the pointer 38. In this position the pin 97 extends through an arcuate cam slot 99 in the time plate 36. As the time plate 36 is rotated through 45°, the indicator 38 will be rotated through 45° by slidable contact of the pin 97 with the precision edge **99*a* of the cam slot 99. The foregoing settings together with the settings shown in Fig. 14 including the adjustment of the rack 49 and the position of the coin retainer pin 66, combine to adapt the meter for two hours with four nickel coins. Therefore, by various adjustments in the time scale 5, the setting pins 64, 65 and 66, the setting rack 49 and the pin 97**, the meter may be adjusted for many combinations of coins and time intervals.

As shown in Fig. 1 in dotted line, a nickel coin N is located at the lower end of the coin entry slot 22, the lower edge of said coin resting upon the coin engagement lever 67. The coin engagement lever 67, shown in Figs. 1, 10–14, is pivoted at 68 on the inner surface of the housing 1, and is located between said housing and the setting plate 10 where it forms the inner edge of the coin channel 23. Thus, the thickness of the lever 67 is substantially equal to that of the coin channel 23. Moreover, the portion of the lever 67 on one side of pivot 68 is retained yieldingly in place by a spring 69, the lower end of which is attached to the housing part 1. The portion of the lever on the other side of the pivot 68 is curved downwardly to form the lower edge of the coin channel 23.

The lower portion of the arcuate plate 59 is preferably overlapped by the upper end of a curved back guide plate 71 which guides coins to a display window 72, commonly known as the "Scotch eye", which is located in the lower portion of the housing 1 (Figs. 1, 5, 6 and 7). Beneath the plate 71 is a guiding rib 73 which is integral with the housing 1 and which guides the outer edge of the coin through that portion of the coin channel 23 immediately above the display window 72.

Moreover, beneath the plate 24 is a coin retaining lever 74 (Fig. 1) which is pivoted at 75 to the housing 1. The lower end of the lever 74 includes a transverse flange portion 76 which extends partially across the lower end of the coin channel 23 so as to retain a coin at the display window 72. The flange 76 functions with the lower end of the guiding rib 73 for retaining the coin N at the window, as shown in Fig. 5. In addition, the coin retaining lever 74 extends above its pivot 75 to a point slightly above the lower end of the coin engagement lever 67.

At the upper end of the lever 74 is a channel-shaped portion 77 extending substantially transversely of the upper portion of said lever. The channel-shaped portion 77 extends around the edges of the plates 24 and 71 and includes a flange 78 having upper and lower inclined edges 79 and 80 which provide a point 81.

The function of the flange 78 is two-fold. As shown in Figs. 5 and 6, as the setting plate 10 is rotated counterclockwise upon the deposition of a coin, the pawl 26 engages one of the teeth 51 on the rack 49 and rotates the time setting mechanism until the rack engaging portion 82 of the pawl 26 contacts the inclined edge 79 on the flange 78. Further rotation thereafter causes the pawl 26 to rotate the lever 74 counterclockwise about its pivot point 75 whereupon the nickel coin N retained at the "Scotch window" 72 by the transverse flange 76 at the opposite end of the lever 74 is released to drop into the coin box (not shown). Thus, the lever 74 rotates counterclockwise until, as shown in Fig. 6, the pawl 26 passes by the point 81 on the flange 78 formed by the inclined edges 79 and 80 thereon.

Thereafter, further rotation of the setting plate 10 carries the pawl 26 beyond the point 81 and into contact with the lower inclined edge 80 of the flange 78, as shown in Fig. 7. At this point, further rotation of the time plate is not possible because the stop flange 90 contacts the stop 92. Upon release of the manual handle 8 (Fig. 2) the setting plate 10 is free to return to the normal or resetting position due to the spring 87. However, reverse rotation of the setting plate 10 does not result in another counterclockwise movement of the lever 74 by the pawl 26 as the pawl returns past the point 81. Since the inclined edge 80 on the flange 78 of the lever 74 is in a plane substantially transverse to a longitudinal axis of that portion of the lever 74 above the pivot point 75, the lever 74 will not yield in response to the return of the pawl 26. For this reason the pawl 26 yields as it passes over the inclined edge 80 and rotates about its pivot point 52 to the position shown by the dotted line in Fig. 7.

Accordingly, the lever 74 serves the purpose of releasing a coin at the "Scotch eye" near the completion of the rotation of the setting plate 10. The lever 74 also releases the setting pawl 26 from engagement with the rack 49 in order to eliminate the possibility of "racking up" additional time with the same coin in the meter which possibility was prevalent in many earlier parking meters.

As shown in Figs. 1 and 2, the setting pawl 26 is provided with a rack engaging edge 82 at the forward end thereof and with a cam arm 83 on the side of the setting plate 10 opposite that of the rack engaging edge 82. In addition, the setting pawl 26 includes an angular flange 84 at its upper end above the cam arm 83 for slidably engaging arcuate edge 25 of the back plate 20. The pivot 52 of the pawl 26 may be a rivet connecting the cam arm 83 to the periphery of the setting plate 10, and a spring washer 85 is preferably located between the plate and the head of said rivet to maintain a sufficient amount of friction between the cam arm 83 and the setting plate 10 so that the pawl 26 will remain in any pivoted position to which it is positively moved.

In addition the setting plate 10 is provided with an arced peripheral portion 86 (Fig. 5, 6 and 7) which is offset from the plane of the setting plate 10 toward the housing 1. When the setting plate 10 is rotated, the peripheral portion 86 moves beneath the lower end of the coin entry slot 22 in order to prevent jamming of the meter by the insertion of additional coins or other objects, such as wires during the rotation of said plate for the setting of a coin which was properly deposited.

As shown in Figs. 1 and 2, when a coin has been inserted through the coin entry slot 22, it is lodged upon the upper part of the coin engagement lever 67 in the coin channel 23 and between the cam arm 83 of the pawl 26 and the coin engaging flange 14 of the coin locating lever 12, as shown by the nickel N in Fig. 1. Thus, the first coin deposited prevents entry of another coin into the channel, and when the setting plate 10 is rotated counterclockwise (as viewed in Fig. 1), the plate portion 86 replaces the position of the nickel N and continues to prevent entry of another coin or object. As the setting plate 10 is further rotated counterclockwise by turning the handle 8, the cam arm 83 of the pawl urges the nickel N through the channel until the edge of the nickel contacts the coin retainer pin 64 (Fig. 10.)

As the setting plate 10 is rotated further, the cam arm 83 rides upwardly on the edge of the coin N until the rack engaging edge 82 engages the rack 49 behind the first tooth 51*a* (Fig. 10). Upon further rotation of the setting plate 10, the coin engagement lever 67 moves radially inwardly to allow the nickel N to pass the pin 64 (Fig. 10). As a setting plate 10 is further rotated, the pawl 26 rotates the rack 49, which in turn rotates the time plate 36 and the indicator 38 causing the indicator to register for a full period of time, in this case, one hour on the time scale 5 (in Fig. 1).

When a penny coin P is inserted in the meter, rotation of the setting plate 10 causes the setting pawl 26 to urge the penny in a manner similar to that described above for the nickel coin N. Due to the smaller diameter of the penny coin, it passes the coin retainer pin 64 and becomes lodged at the coin retainer pin 65 (Fig. 11) between said pin and the edge of the coin engagement lever 67. Further rotation of the setting plate 10 causes the cam arm 83 of the pawl 26 to raise the pawl upwardly so that the rack engaging edge 82 of the pawl engages the fifth tooth 51*e*, as shown in Fig. 11. Continued rotation of the setting plate 10 causes the coin engagement lever 67 to yield radially inwardly to allow the penny P to move past the pin 65. At the same time, the rack 49 is rotated until the setting plate 10 is rotated to the limit of its movement. However, the effective rotation of the setting plate 10 is less for the reason that the plate 10 is rotated further before the setting pawl 26 is caused to engage the rack. Hence, a smaller time period is registered by the indicator 38 on the time scale 5.

As shown in Fig. 1, the setting plate 10 is retained in the position shown, hereinafter referred to as the normal or returned position, by means of a spring 87, one end of which is secured to a flange 88 at the lower edge of the back guide plate 71, and the other end of which is secured to an upwardly extending ear 89 on the setting plate 10. In addition, a stop flange 90 extends from the setting plate 10 toward the housing 1. The stop flange 90 engages a stop 91 extending from the housing 1 when the setting plate 10 is in the returned position (Fig. 1). The stop flange 90 contacts a stop 92 which is secured by a screw 93 to the housing 1 (Fig. 1), said screw extending through a slot 94 in said stop.

In Fig. 7 the setting plate 10 is shown in its fully rotated position in which the stop flange 90 contacts the stop 92 on a bevel edge 95 thereof. The purpose of the bevel edge 95 and the slot 94 on the stop 92 is to permit small adjustments of the stop by moving it longitudinally. Accordingly, an adjustable stop means is provided to enable an accurate setting of the setting plate 10 to accommodate inaccuracies or accumulations of tolerances in the assembly and construction of the parts of the meter.

Moreover, the stops 91 and 92 are so spaced as to engage the stop flange 90 to permit a total rotation of the setting plate 10 of approximately 90°. However, as is evident in Fig. 10, the setting plate 10 rotates approximately 45° from the position shown in Fig. 1 before the pawl 26 engages the rack teeth 51 with a nickel coin N, and therefore the rack 49 is rotated approximately 45°. However, when a penny coin P is deposited, the setting plate 10 rotates approximately 81° (Fig. 11) before the pawl 26 engages the rack. Thus, the rack 49 rotates approximately 9° to move the indicator one-fifth the distance it is moved by the nickel coin.

Insertion of additional pennies accompanied by a full turn of the handle 8 causes the indicator 38 to advance progressively to 24, 36, 48 and 60 minutes, the second penny causing the pawl 26 to engage the fourth tooth 51*d*, the third penny causing the pawl to engage the third tooth 51*c*, etc.

Referring to Figs. 3, 4 and 16–21, a pair of expiration or violation flags 100 and 101 are mounted on the upper end of a bracket arm 102. A pin 103 on the arm 102 operates in an arcuate slot 104 (Figs. 18 and 19) in the mounting plate 28 to limit the pivotal movement of the bracket arm between the expired time position of Fig. 16 and the unexpired position of Fig. 18. A toggle spring 105 is attached to an ear 106 on the bracket arm 102 (Fig. 17) for raising the arm immediately when the indicator 38 is returned to zero position (Fig. 16) by the timing mechanism, and for lowering the arm 102 when the time plate 36 begins to rotate the indicator toward the resetting or zero position.

In order for the spring 105 to function in raising and lowering the violation flags 101 and 102, the lower end of the spring is movably mounted between positions above or below a pivot 107 of the bracket arm 102. The means for swinging the lower end of the spring 105 above and below the pivot 107 preferably includes a forked lever 108 (Fig. 20) which is journalled on the pivot 107 and which has an angular arm 109 (Fig. 21) extending through an arcuate slot 110 in the mounting plate 28. The lower end of this toggle spring 105 is attached to the end of the angular arm 109.

The means for engaging the forked lever 108 to swing the lower end of the spring 105 to positions above and below the pivot 107 preferably consists of a stop pawl 111 attached to the time plate 36 by a screw 112 extending through a notch 113 (Fig. 15) at the periphery of the plate 36 to engage the lever 108. Adjacent the pivot 107 is a suitable stud 114 (Fig. 20) screwed in the plate 28 and adapted to be abutted by the pawl 111 after the pawl actuates the lever 108 when the indicator 38 reaches zero. At such position the clock mechanism is stopped by contact of the pawl 111 with the stud 114. The lever 108 is rotated through an arc of approximately 90° by the pawl 111 which actuates the lever between said positions by contacting either fork portion thereof. Thus, as the indicator 38 approaches the zero position (Fig. 16), the pawl 111 enters the space between the forks of the lever 108 and turns the lever to the position shown in Fig. 16. The lower end of the toggle spring 103 is thereby moved from a position below the pivot 107 (Fig. 19) to a position above said pivot (Fig. 17) by the angular arm 109 on the lever 108. In this manner the flags 100 and 101 are raised and lowered by the spring 105 depending upon the positions of the lower end of the spring with respect to the pivot 107 of the arm 109.

In addition to the foregoing means for actuating the expiration flags, an additional mechanism is provided to overcome a difficulty existent in previous parking meters. In preceding meters it was possible to sustain the flags 100 and 101 in lowered or hidden position, as shown in Fig. 18, merely by preventing the manual handle 8 from disengaging a rack tooth by inserting an object in the space between the handle and the surface of the meter housing 1. To prevent this difficulty, a yoke or bifurcated member 115 is mounted on an arm 116 (Fig. 20), a portion of which arm is U-shaped so as to extend from the rear of the mounting plate 28 to the front side of the rack 49. The arm 116 is pivoted at 117 on the plate 28 as shown in Figs. 17, 19 and 21. Hence, the yoke 115 is movable between a lower position, as shown in Figs. 16–19, and an upper position, as shown in Figs. 20 and 21, between which positions it is actuated by the rack-engaging portion 82 of the setting pawl 26.

As shown in Figs. 17, 19 and 21, the portion of the arm 116 on the rear of the mounting plate 28 includes an elongated portion 118 extending from the pivot 117 and at right angles to the arm 116. At the end of the portion 118 remote from the pivot 117 is an inturned flange 119 which is adapted to engage one edge of the bracket arm 102 in order to sustain the flags 100 and 101 in the raised position as shown in Fig. 21.

By various combinations of positions of the yoke 115 and the forked lever 108 the expiration flags 100 and 101 are properly raised and lowered in a fool-proof manner. As shown in Figs. 16 and 17, the indicator 38 is located at the zero or expired position with the flags 100 and 101 raised to indicate the expiration of parking time. In this position, the setting pawl 26 is in the normal or returned position so that the rack engaging portion 82 thereof is located in the yoke 115 thereby holding the bracket arm 116 down so that the flange 119 (Fig. 17) is out of engagement with the bracket arm 102. Moreover, the time plate 36 being in the normal or expired position likewise places the stop pawl 111 against the stud 114 so that the pawl is also disposed within the forked lever 108, whereby the angular arm 109 of the forked lever is in the uppermost position above the pivot 107 of the bracket arm 102. Thus, the toggle spring 105 holds the expiration flags 100 and 101 in the raised position.

In Figs. 18 and 19 the time indicator 38 is shown in an unexpired position and the flags 100 and 101 are lowered. Also, the rack engaging portion 82 of the setting pawl 26 is disposed within the yoke 115 so as to hold the flange 119 (Fig. 19) in the lowermost position to permit the flags to be lowered upon setting the pointer 38 for the indicated time period. However, the time plate 36 is in position corresponding to that of the indicator 38 so that the stop pawl 111 is out of contact with the forked lever 108, for which reason the latter is upturned (Fig. 18) while the angular arm 109 thereof is down-turned (Fig. 19) below the pivot 107. Hence, the flags 100 and 101 are retained by the toggle spring 105 in their lowered positions.

In Figs. 20 and 21 a third status exists; that is, the indicator 38 registers unexpired time, the expiration flags 100 and 101 are raised, and the setting pawl 26 is out of engagement with the yoke 115 indicating that the manual handle 8 has not yet been released to permit the spring 87 (Fig. 1) to return the setting plate 10 with the setting pawl 26 thereon to resetting or normal position. With the rack engaging portion 82 of the setting pawl 26 out of the yoke 115 (Fig. 20), the yoke is raised to its uppermost position by spring 120 (Fig. 21) which is centrally secured to the pivot pin 117 and has ends secured to the mounting plate 28 and the arm 116. Thus, the flange 119 retains the bracket arm 102 in the upper position, notwithstanding the fact that the angular arm 109 of the forked lever 108 is situated below the pivot 107. Upon lowering the yoke 115, the flags 100 and 101 are likewise lowered. However, if the manual handle 8 is jammed to prevent its return to the normal or resetting position so that the setting pawl 26 is likewise prevented from engaging the yoke 115, the expiration flags remain in the raised position as shown during the time that the indicator 38 passes from the position shown to the zero position. Accordingly, the yoke 115 and its associated parts function with the other parts of the meter to present a more fool-proof parking meter.

Finally, in Fig. 22 another embodiment of the pawl 55 is generally indicated at 121. The pawl 121 is similar to the pawl 55 in all respects except one. Instead of having a lateral flange *55a*, the pawl 121 is provided with a cylindrical roller 122 for riding on the periphery of the setting plate 10. The roller 122 is mounted on a roller pin 123 having a stub shaft secured to the pawl 121 by a screw 124.

The improved manually operated meter is thus easily adjusted to be operated for one or more hours or fraction thereof. In each case the meter may be operated with coins of different denominations or combinations thereof to accumulate the proper amount of time in the meter.

The meter includes a positively acting overspeed device which has a pawl that drops into a notch on the periphery of the setting plate regardless of the rate of acceleration thereof. Moreover, the meter includes an adjustable stop for limiting the movement of the setting plate to compensate for inaccuracies in construction or accumulations of tolerances in the assembly of other parts of the meter.

In addition, the meter provides detachable coin retaining points affording greater versatility of operation with nickels, pennies or combinations thereof. Further, the meter includes a lever for releasing previously deposited coins at the observation window or "Scotch eye," whereby the release occurs at the end of the rotation of the manual handle rather than at the beginning thereof so as to assure complete rotation of the handle each time a coin is deposited.

Also, the annular time rack has been redesigned to provide notches on the external surface to cooperate with the overspeed pawl as well as providing a redistribution of teeth on the inner periphery of the rack which permits the adjustment of the rack at positions corresponding to the operation of the meter for pennies, nickels, or combinations thereof for time periods greater or less than one-hour operation.

An outstanding improvement in this invention is the addition of a means including a yoke for facilitating of the operation of the flag between raised and lowered positions in a fool-proof manner. Finally, the device of this invention includes a more positive connection between the escapement mechanism and the time setting portion of the meter that eliminates play or backlash between the time plate and the escapement mechanism.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiment of the improved construction illustrated and described herein is by way of example, and the scope of the present invention is not limited to the precise details of construction.

Having now described the features, constructions and principles of invention, the characteristics of the new manually operated meter, and the advantageous, new and useful results provided, the new and useful discoveries, principles, parts, elements, combinations, subcombinations, structures and arrangements, and mechanical equivalents obvious to those skilled in the art, are set forth in the appended claims.

I claim:

1. In a parking meter having a rotatable setting disk forming one side of a coin channel, a coin entry slot communicating with said channel, and setting pawl means pivoted on said disk for engagement with a rotatable indicator setting rack by contacting a coin in said channel; a housing member, a laterally extending stop member, means laterally adjustably mounting the stop on the housing near the disk, the stop having a striking edge extending at an acute angle to the direction of lateral adjustment, and a stop flange on the disk engaging the striking edge at the limit of setting movement of the disk, whereby adjustment of stop member determines the exact limit of movement of the disk.

2. In a parking meter having a reversely rotatable setting disk forming one side of a coin channel, a coin entry slot communicating with said channel, setting pawl means pivoted on said disk for engagement with a rotatable indicator setting rack by contacting a coin in said channel, and a coin display window at the end of the channel remote from the entry slot; a coin-detaining lever adjacent the display window, the lever having a pawl-engaging portion in the path of movement of the pawl means, the lever being yieldingly held normally in a position holding a first deposited coin at the display window, the pawl-engaging portion being engaged by the pawl means as the setting disk approaches its limit of movement when rotated in one direction to move the detaining lever to release the first deposited coin from the window, the pawl-engaging portion of the lever being engaged by the pawl and the pawl being moved thereby to non-rack-engaging position upon return movement of the disk in the other direction from its limit of setting movement.

3. In a parking meter having a reversely rotatable manual handle, a rotatable setting disk associated with the handle and forming one side of a coin channel, the disk and handle being spring-biased to a resetting position, setting pawl means pivoted on said disk for engagement with a rotatable indicator setting rack by contacting a coin in said channel, and a time expiration flag operable between visible and non-visible positions; a pawl-engageable lever pivotally mounted adjacent the disk and operable between a first position and a second position corresponding to the visible and non-visible positions of the flag respectively, the lever being normally spring-biased in the first position and having a flange engageable with the expiration flag to hold the flag in visible position when the lever is in the first position, and the lever being engaged by the pawl and moved thereby to the second position upon return of the disk to resetting position.

4. In a parking meter having a rotatable setting disk forming one side of a coin channel, a coin entry slot communicating with said channel, setting pawl means pivoted on said disk for engagement with a rotatable indicator setting rack by contacting a coin in said channel; the disk having a peripheral notch, the setting rack having at least one notch, a pawl pivotally mounted near and having a first detent spring-biased against the periphery of the disk engageable with the peripheral notch at the limit of setting movement of the disk, the pawl also having a second detent normally held out of engagement with the notch in the rack by engagement of said first detent with the periphery of said disk and moved by said spring into engagement engageable with the notch on the rack upon movement of the first detent into the notch on the disk and at the desired point in the setting movement of the rack, a housing member, a laterally extending stop member, means laterally adjustably mounting the stop member on the housing near the disk, the stop having a striking edge extending at an acute angle to the direction of lateral adjustment, and a stop flange on the disk engaging the striking edge at the limit of setting movement of the disk, whereby adjustment of the stop member determines the exact limit of movement of the disk.

5. In a parking meter having a rotatable setting disk forming one side of a coin channel, a coin entry slot communicating with said channel, setting pawl means pivoted on said disk for engagement with a rotatable indicator setting rack by contacting a coin in said channel and a coin display window at the end of the channel remote from the entry slot; a coin retainer pin at one edge of the coin channel to detain coins of a predetermined size, one of the sides of the channel having at least two pin-receiving apertures, the location of each aperture corresponding to the size of a predetermined coin, a coin detaining lever adjacent the display window, the lever having a pawl-engaging portion in the path of movement of the pawl means, the lever being yieldingly held normally in a position holding a first deposited coin at the display window, the pawl-engaging portion being engaged by the pawl means as the setting disk approaches its limit of movement when rotated in one direction to move the detaining lever to release the first deposited coin from the window.

6. In a parking meter having a reversely rotatable manual handle, a rotatable setting disk associated with the handle and forming one side of a coin channel, the disk and handle being spring-biased to a resetting, time-expired position, a setting pawl pivoted on said disk for engagement with a rotatable indicator setting rack by contacting a coin in said channel, a fixed mounting plate, and a time expiration flag supported on a flag lever pivotally mounted on the mounting plate and operable between visible and non-visible positions; a second, pawl-engaging lever pivotally mounted on the mounting plate in the path of movement of the pawl and operable between a first position and a second position corresponding to the visible and non-visible positions of the flag respectively, the second lever being normally spring-biased in the first position and having flange means engageable with the expiration flag lever to hold the flag in visible position when the second lever is in the first position, the second lever being engageable by the setting pawl and movable thereby to the second position upon return of the disk to the resetting position, a second pawl associated with the setting rack and movable therewith, a toggle mechanism pivotally mounted on the mounting plate in the path of movement of the second pawl and operable between a time-expired position and a time-unexpired position corresponding to the visible and non-visible positions of the flag, the toggle mechanism having a flange portion movable between opposite sides of the pivot point of the flag lever corresponding to the visible and non-visible positions of the flag, toggle spring means extending between the flange portion and the flag lever, whereby movement of the rack and second pawl into and out of the time-expired position moves the flag into visible and non-visible positions respectively, when the second lever is in the second position.

7. In a parking meter having a rotatable setting disk forming one side of a coin channel, a coin entry slot communicating with said channel, and setting pawl means pivoted on said disk for engagement with a rotatable indicator setting rack by contacting a coin in said channel; the setting rack having at least one peripheral notch, a pawl pivotally mounted in said meter and having first and second detents laterally opposite the disk and the rack respectively, a spring biasing said detents toward the respective rack and disk peripheries, the spacing between said disk and rack peripheries and said detents being such that said second detent is held out of engagement with said rack by engagement of said first detent with the periphery of said disk, the periphery of said disk being interrupted by a notch to permit pivotal movement of said pawl to dispose said first detent in said disk notch and said second detent in said rack notch at a desired point in the setting movement of the rack.

References Cited in the file of this patent

UNITED STATES PATENTS

| | | |
|---|---|---|
| 2,256,398 | Lucia | Sept. 16, 1941 |
| 2,416,213 | Partin | Feb. 18, 1947 |
| 2,563,182 | Michaels | Aug. 7, 1951 |
| 2,603,288 | Sollenberger | July 15, 1952 |
| 2,613,792 | Broussard | Oct. 14, 1952 |
| 2,642,170 | Michaels | June 16, 1953 |
| 2,660,283 | Broussard | Nov. 24, 1953 |
| 2,696,899 | Trier | Dec. 14, 1954 |
| 2,712,868 | Allen | July 12, 1955 |
| 2,718,954 | Partin | Sept. 27, 1955 |
| 2,755,904 | Moore | July 24, 1956 |